(12) United States Patent
Luechinger

(10) Patent No.: US 7,922,043 B2
(45) Date of Patent: *Apr. 12, 2011

(54) DOSAGE-DISPENSING DEVICE FOR SUBSTANCES IN POWDER- OR PASTE FORM

(75) Inventor: Paul Luechinger, Uster (CH)

(73) Assignee: Mettler-Toledo AG, Greifensee (CH)

( * ) Notice: Subject to any disclaimer, the term of this patent is extended or adjusted under 35 U.S.C. 154(b) by 819 days.

This patent is subject to a terminal disclaimer.

(21) Appl. No.: 11/815,563

(22) PCT Filed: Oct. 3, 2006

(86) PCT No.: PCT/EP2006/067010
§ 371 (c)(1),
(2), (4) Date: Aug. 6, 2007

(87) PCT Pub. No.: WO2007/039613
PCT Pub. Date: Apr. 12, 2007

(65) Prior Publication Data
US 2008/0308579 A1  Dec. 18, 2008

(30) Foreign Application Priority Data
Oct. 3, 2005  (EP) .................................. 05109150
Oct. 3, 2005  (EP) .................................. 05109151

(51) Int. Cl.
*G01F 11/20*  (2006.01)
(52) U.S. Cl. ........................ 222/239; 222/344
(58) Field of Classification Search ................. 222/239, 222/344–347, 365, 240, 367, 408, 410–414, 222/195–200, 440, 457
See application file for complete search history.

(56) References Cited

U.S. PATENT DOCUMENTS
427,165 A * 5/1890 Fickett .......................... 222/230
(Continued)

FOREIGN PATENT DOCUMENTS
DE   198 41 478 A1   3/1999
(Continued)

OTHER PUBLICATIONS
Form PCT/ISA/210 (International Search Report) dated Feb. 6, 2007.
(Continued)

Primary Examiner — Lien T Ngo
(74) Attorney, Agent, or Firm — Buchanan Ingersoll & Rooney PC (57) ABSTRACT

A dosage-dispensing device for substances in powder- or paste form is equipped with a supply container and a dosage-dispensing head which is connected or connectable to the supply container and which has a housing with an outlet orifice of circular cross-section. The dosage-dispensing head further has a delivery- and closure element, wherein the outlet orifice and the delivery- and closure element are arranged on the central lengthwise axis of the dosage-dispensing head, and the delivery- and closure element is designed to be rotatable about the central lengthwise axis in relation to the housing and to be capable of translatory displacement along the central lengthwise axis relative to the outlet orifice. The delivery- and closure element in its basic configuration is of a cylindrical shape and has at least two closure portions that are arranged at a distance from each other along the central lengthwise axis and serve to close off the outlet orifice and further has, between the closure portions, a delivery portion that serves to deliver the substance to be dispensed, wherein said delivery portion comprises at least one recess that is indented from the cylinder wall.

20 Claims, 5 Drawing Sheets

U.S. PATENT DOCUMENTS

| | | | | |
|---|---|---|---|---|
| 1,171,575 A * | 2/1916 | Zsidakovitz | | 222/336 |
| 1,222,245 A * | 4/1917 | Schmoller | | 222/173 |
| 1,303,141 A * | 5/1919 | Younger | | 222/307 |
| 1,313,174 A * | 8/1919 | Eisenhardt | | 222/365 |
| 1,547,953 A * | 7/1925 | Palmer | | 222/510 |
| 1,637,189 A * | 7/1927 | Helberger | | 222/336 |
| 2,084,029 A | 6/1937 | Hochstim | | |
| 2,121,878 A * | 6/1938 | Locker | | 222/179.5 |
| 2,311,330 A * | 2/1943 | Dudley | | 222/197 |
| 2,357,387 A * | 9/1944 | Dudley | | 222/205 |
| 2,628,003 A * | 2/1953 | Maurer | | 222/336 |
| 2,630,246 A * | 3/1953 | Gilmore | | 222/142.6 |
| RE24,079 E * | 10/1955 | Mateer | | 222/378 |
| 2,792,155 A * | 5/1957 | Bellardi | | 222/266 |
| 2,847,147 A * | 8/1958 | Land | | 222/341 |
| 3,064,858 A * | 11/1962 | Ziegler | | 222/49 |
| 3,486,664 A * | 12/1969 | Loomans | | 222/413 |
| 3,790,040 A * | 2/1974 | Bahr et al. | | 222/413 |
| 3,823,853 A * | 7/1974 | Alden | | 222/365 |
| 4,084,626 A * | 4/1978 | King | | 141/7 |
| 4,084,726 A * | 4/1978 | Nicol | | 221/266 |
| 4,138,979 A * | 2/1979 | Taplin | | 123/436 |
| 4,325,495 A * | 4/1982 | Mokris | | 222/1 |
| 4,668,478 A * | 5/1987 | Homer et al. | | 422/159 |
| 4,693,394 A * | 9/1987 | Martin et al. | | 222/1 |
| 4,905,525 A | 3/1990 | Kurfürst | | |
| 5,138,979 A * | 8/1992 | Baird et al. | | 119/51.04 |
| 5,145,009 A | 9/1992 | Mheidle et al. | | |
| 5,259,537 A * | 11/1993 | Beers et al. | | 222/246 |
| 2007/0080179 A1* | 4/2007 | Brinz et al. | | 222/412 |

FOREIGN PATENT DOCUMENTS

| | | |
|---|---|---|
| EP | 0 201 777 A2 | 11/1986 |
| EP | 0 654 442 A1 | 5/1995 |
| FR | 2 607 794 A1 | 6/1988 |
| FR | 2 682 083 A1 | 4/1993 |
| GB | 701572 | 12/1953 |
| GB | 1 601 568 | 10/1981 |
| JP | 60-052724 A | 3/1985 |

OTHER PUBLICATIONS

European Search Report of EP 05 10 9150 dated Mar. 9, 2006 (with English translation of category of cited documents).

European Search Report of EP 05 10 9151 dated Mar. 9, 2006 (with English translation of category of cited documents).

* cited by examiner

DOSAGE-DISPENSING DEVICE FOR SUBSTANCES IN POWDER- OR PASTE FORM

The invention relates to a dosage-dispensing device for substances in powder- or paste form which has a dosage-dispensing head that can be or is connected to a source- or supply container.

Dosage-dispensing devices of this kind find application particularly for the dispensing of small quantities of, e.g., toxic substances into small target containers with a high degree of precision. Such target containers are frequently set on a balance in order to weigh the quantity of substance delivered out of the dosage-dispensing device, so that the substance can subsequently be further processed as directed.

The substance to be dispensed in doses is held for example in a supply container which has a connection to the dosage-dispensing head. To perform the dosage-dispensing process, the supply container and the dosage-dispensing head together form a unit, the dosage dispensing-device. The opening of the dosage-dispensing device through which the substance to be dispensed is delivered should preferably be small to allow the targeted delivery of the substance into a container with a narrow opening.

Dosage-dispensing devices for dry and/or powdery pourable materials, for example color dye powders, are known from the prior art and are in operation. As an example, a dosage-dispensing device is described in U.S. Pat. No. 5,145,009 A, consisting of a delivery container with a closable outlet at its underside. As a closure device, a conical valve body is used which has a narrowing taper towards the top and is movable vertically downward to open an outlet orifice. In its open position, the valve body rotates, and is equipped with means to advance the material in the direction of the outlet orifice.

The device of the foregoing description is less suitable for the dispensing of pourable material into containers that have openings with a narrow cross-section. The structure of the valve body with the upward-narrowing taper as well as the rotation of the valve body will cause the particles of the pourable material to leave the outlet with a radial, i.e. horizontal velocity component and will therefore cause a scattering of the particles which can reach even beyond a relatively large opening cross-section of a receiving container.

A method and a device for the delivery of a very small sample quantity of a powder or paste, for example for applications in atomic absorption spectroscopy, are disclosed in U.S. Pat. No. 4,905,525 A. In a supply container with an outlet orifice at the end of a form channel, a piston reaches from above into the sample material in the container. A small sample quantity is pushed through the form channel and delivered from the outlet orifice by pressing the piston into the sample material so that the sample material is compacted above the form channel. In a special embodiment the container is configured in the shape of a funnel towards the outlet orifice and the piston is arranged in an oblique position relative to the outlet orifice.

A dosage-dispensing device for viscous, pasty, powdery or granular products is described in DE 198 41 478 A1, with a supply container of a shape which in the operating position of the dosage-dispensing device has a narrowing taper towards the bottom end where the container has an outlet orifice. Wiper tools are attached to a centrally arranged and rotatable hollow shaft. The dosage-dispensing device has a dosage valve with a valve stem that is arranged inside the hollow shaft, is capable of translatory up- and down-movement, and has at its bottom end a conical valve head with an upward-narrowing taper, so that the outgoing quantity of the dispensed material can be regulated and the outlet orifice can be closed off from above. In some of the embodiments described the dosage valve is likewise designed to be rotatable.

A dosage-dispensing device according to DE 198 41 478 A1 or according to U.S. Pat. No. 5,145,009 A is limited in how small the quantity to be delivered out of the container can be. As the outlet orifice is ring-shaped, the minimum width of the ring gap that can be used for dispensing cannot be narrower than the dimension of the smallest unit of a pourable material, for example a grain of powder, and consequently several units of the pourable material can exit simultaneously through the ring gap. There is further a risk that, depending on the consistency of the pourable material, a part of the gap can be clogged up. This can happen in particular if the delivery rate is to be slowed down towards the end of the dosage-dispensing process by reducing the width of the ring gap, because this will lead to a progressively less favorable ratio between the width and circumference length of the ring gap.

The object of the invention is to propose a dosage-dispensing device that allows the smallest substance quantities of powders or pastes to be filled in a controlled manner into a container.

This task is solved through the features of the independent claims.

A dosage-dispensing device for substances in powder- or paste form is equipped with a supply container and, connected or connectable to the latter, a dosage-dispensing head comprising a housing with an outlet orifice of circular cross-section. The dosage-dispensing head further comprising a delivery- and closure element, wherein the outlet orifice and the delivery- and closure element are arranged on the central lengthwise axis of the dosage-dispensing head, and the delivery- and closure element is designed to be rotatable about the central lengthwise axis in relation to the housing and to be capable of translatory displacement along the central lengthwise axis relative to the outlet orifice. The delivery- and closure element is cylindrical in its basic shape and has at least two cylindrical closure portions which are arranged at a distance from each other along the central lengthwise axis and serve to close off the outlet orifice, and a delivery portion which is arranged between the closure portions and serves to deliver the substance to be dispensed, wherein the delivery portion has at least one recess that is indented from the cylinder wall.

This dosage-dispensing device is particularly well suited for dispensing strongly coagulating substances, because it allows the latter to be delivered in measured portions.

A first closure portion is located above the delivery portion and a second closure portion below the delivery portion, relative to the orientation of the dosage-dispensing device when the latter is in an operative condition. The delivery- and closure element remains rotatable about the central lengthwise axis when the first closure portion is located in the outlet orifice and also when the second closure portion is located in the outlet orifice, in order to allow the at least one recess to be filled up when the latter is inside the dosage-dispensing head, and also to allow that the substance to be delivered is released from the at least one recess when the latter is outside the dosage-delivery head.

The at least one recess in the delivery portion of the delivery- and closure element in a special embodiment has a continuous surface. This delivery surface can be shaped with a concave curvature in one or two directions and in some cases with a spiraling twist about the central lengthwise axis. The at least one recess can also have a discontinuous surface. In the latter case, the recess is formed for example by a triangular groove.

Whatever the shape of the recess or, in particular, the groove, its width and depth are variable in such a way that its profile gets smaller towards the first closure portion.

The delivery- and closure element is made preferably of metal or of a ceramic material, wherein the surface of the at least one recess has a surface roughness $R_a$ smaller than 0.003 mm.

The delivery portion in an advantageous embodiment has at least two and in particular three recesses, specifically circular depressions arranged above each other. This allows a sequential delivery of portions of the substance that is to be dispensed.

In the first closed position of the delivery- and closure element, the bottom end (relative to the operating position of the apparatus) of the first closure portion is in flush alignment with the surface of the housing. In a particularly advantageous embodiment, the closure portion of a delivery- and closure element has at its end surface a recess that is enclosed by a rim which functions as a drop-releasing edge.

In a particularly preferred further developed embodiment, the dosage-dispensing device includes a conveying tool which is likewise configured to be rotatable about the central lengthwise axis. By means of the conveying tool, substance that is to be dispensed is moved towards the outlet orifice and substance that clings to the rim of the outlet orifice is released from the latter. Thus, no substance remains in the outlet orifice. This eliminates the possibility of substance getting caught in the outlet orifice whereby a complete closure would be made impossible when the outlet orifice is to be completely closed at the end of the dispensing process. The conveying tool also makes it possible to dispense strongly coagulating powders such as powders containing charged particles, or to dispense pastes, in that the conveying tool loosens these substances, moves them to the outlet orifice, and wipes them off the rim of the outlet orifice.

The conveying tool can be pushed against the rim of the outlet orifice by means of a spring force. In a preferred design, the conveying tool has a stirrer part and a conveying element, wherein the conveying element in an advantageous design has a portion with an extensive smooth surface and, when in operation, the conveying element is always in loose contact with the rim of the outlet orifice. In a specific configuration, the conveying element has a tip which is in contact with the rim of the outlet orifice during operation.

With preference, the conveying element is positioned at an acute angle relative to the tangential direction of the circular path traveled by the conveying element in its rotation about the central lengthwise axis, and/or the conveying element is slanted at an acute angle relative to the central lengthwise axis.

In a specific embodiment, the delivery- and closure element is connected to a rod which is arranged along the central lengthwise axis, and the conveying tool is constrained in such a way as to be capable of translatory displacement along the central lengthwise axis in relation to the rod and the delivery- and closure element.

In a particularly preferred further developed embodiment, the dosage-dispensing head and/or the dosage-dispensing device itself has a housing of a shape that is narrowed down towards the outlet orifice.

Under a further aspect of the invention, at least one agitator is arranged outside the dosage-dispensing device which serves to clear the at least one recess of the substance to be dispensed. In a preferred design, the agitator comprises brushes or lamellar wipers reaching into the at least one recess. As an alternative, the agitator can also take the form of at least one jet nozzle for compressed air which is arranged with its orifice directed at the delivery- and closure element.

In a further preferred embodiment, the agitator can include a knocking- and/or vibrating tool which is designed so that its action is directed parallel and/or orthogonal to the central lengthwise axis at the housing and/or at the delivery- and closure element and/or at the rod.

With this dosage-dispensing device, substances in the form of a powder or paste can be dispensed in measured doses from a supply container to which a dosage-dispensing head is or can be connected, by a method with the following steps:

in a first closed condition of the outlet orifice, where the first closure portion is located in the outlet orifice and the delivery portion is located inside the dosage-dispensing head, the at least one recess is filled with substance through a rotation of the delivery- and closure element;

the at least one recess of the delivery portion which is filled with the substance to be dispensed is moved into an area outside of the dosage-dispensing head through a translatory displacement of the delivery- and closure element along the central lengthwise axis; and in a second closed condition of the outlet orifice, where the second closure portion is located in the outlet orifice, the substance is released from the at least one recess through a rotation of the delivery- and closure element.

In a preferred embodiment of the method, substance to be dispensed is brought into the at least one recess by means of the conveying tool.

If there is an agitator, the substance is set free, i.e. delivered, from the at least one recess of the delivery portion by means of the agitator.

The dosage-dispensing device is hereinafter described through examples that are represented schematically in the drawings, wherein.

Figure 1:
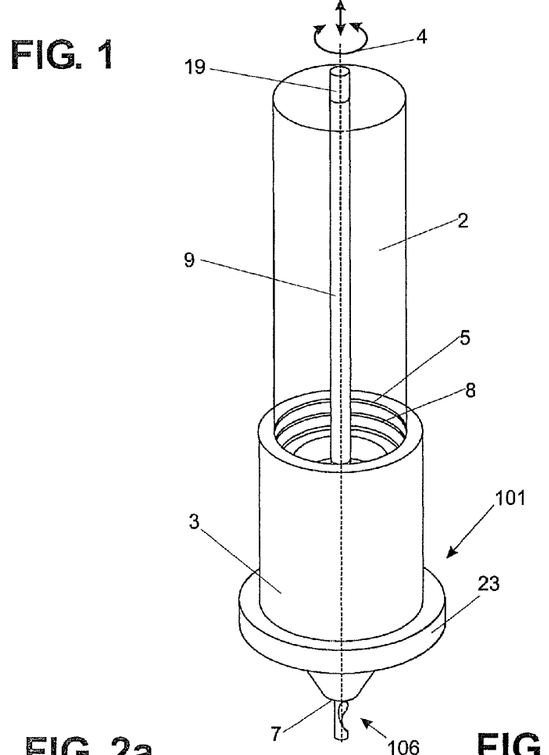
FIG. 1 illustrates in a three-dimensional drawing a dosage-dispensing device with a dosage-dispensing head screwed on to a supply container.

FIG. 1 shows a dosage-dispensing device for substances in powder- or paste form which includes a dosage-dispensing head 101 and a supply container 2. The dosage-delivery device has in essence an axially symmetric configuration. In its operating position, for example in a dosage-dispensing process, or in a position ready to operate, it is oriented with its central lengthwise axis 4 directed vertically. In the arrangement of FIG. 1, the dosage-dispensing head 101 which has a housing 3 is located below the supply container 2. It is joined to the supply container 2, and prior to filling the supply container, the dosage-dispensing head was screwed onto the supply container by means of an internal screw thread 5 of the dosage-dispensing head 101 and an external screw thread 8 of the supply container 2. In principle, the dosage-dispensing head can be releasably connected to the supply container through any state-of-the-art connection, or it can also have a fixed connection to the supply container. However, to facilitate cleaning, a dosage-dispensing head 101 that can be set into place or screwed to the supply container 2 is preferable.

The housing 3 has a projecting ledge 23 which serves for example to fasten the dosage-dispensing device in a holder that is not shown here. However, although this narrowed-down shape is preferred, it is not an absolute requirement.

As can be seen in FIG. 1, a delivery- and closure element 106, shown here in a first embodiment, protrudes from the outlet orifice 7. In this condition, a second closure portion 127b is positioned in the outlet orifice 7, as is explained in detail in the context of FIG. 2b. In this position, substance that is to be dispensed and which was moved from the dosage-dispensing head 101 to the outside by means of the delivery- and closure element 106 can be discharged into a container that is placed below the dosage-dispensing device. A rod 9 which is connected to the delivery- and closure element 106 and forms a drive shaft traverses the supply container 2 and, as shown in FIG. 1, protrudes at its upper end from the supply container 2. The upper end of the rod 9 has a coupling area 19 for a drive mechanism which is not shown here and which may be a manual or a motorized drive mechanism.

Figure 2A:
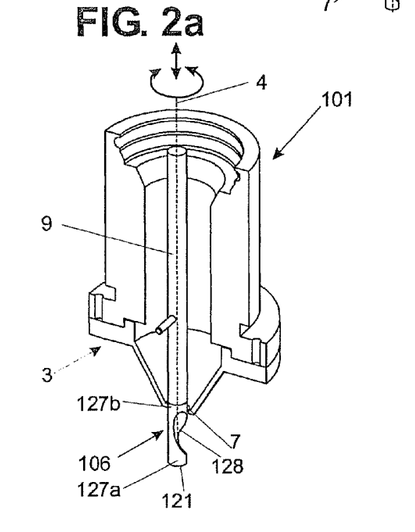
FIG. 2a illustrates in a three-dimensional drawing a dosage-dispensing head with a first embodiment of the delivery- and closure element in the second closed position, with the housing of the dosage-dispensing head cut open in the lengthwise direction.

FIG. 2a shows a dosage-dispensing head 101 with a first embodiment of a delivery- and closure element 106 in a three-dimensional representation wherein the housing 3 of the dosage-dispensing head 101 is cut open lengthwise. The delivery- and closure element 106 has two closure portions 127a, 127b, both of which are shaped cylindrically.

The way in which the outlet orifice 7 is closed off is that the second closure portion 127b is positioned in the outlet orifice. The delivery- and closure element 106 is rigidly connected to the rod 9 which extends along the central lengthwise axis 4 of the dosage-delivery head 101 and of the dosage-dispensing device. The rod 9, and thus the delivery- and closure element 106, are designed to be rotatable about the central lengthwise axis 4 as well as capable of translatory movement along the lengthwise axis 4. The rod 9 in this arrangement is preferably driven by a motor. It is considered self-evident that the delivery- and closure element can also be configured of one piece together with the rod.

Figure 2B:
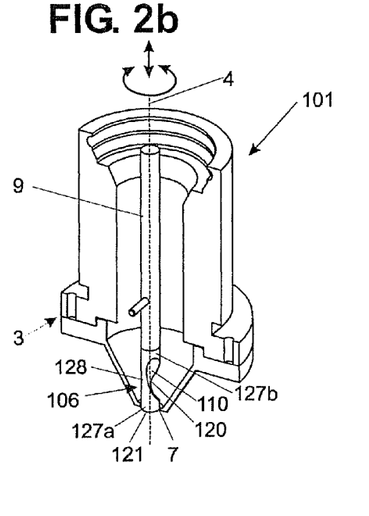
FIG. 2b illustrates in a three-dimensional drawing a dosage-dispensing head with a first embodiment of the delivery- and closure element in the first closed position, with the housing of the dosage-dispensing head cut open in the lengthwise direction.

FIG. 2b shows the dosage-delivery head in the same form of representation as used in FIG. 2a, but in this case with the first closure portion 127a of the delivery- and closure element 106 positioned in the outlet orifice 7. With a translatory displacement of the delivery- and closure element 106 along the central lengthwise axis 4, i.e. in the vertical direction in FIGS. 2a and 2b, the outlet orifice 7 is first opened and then closed again.

The delivery- and closure element 106 is of a basically cylindrical shape. In its delivery area 128, the delivery- and closure element 106 has an indentation from the cylinder wall in the shape of a recess 120 which forms the delivery portion. The surface of this recess 120 is continuous and forms a delivery surface 110. The delivery- and closure element 106 is preferably made of metal or of a ceramic material, with the surface of the at least one recess having a surface roughness $R_a$ of less than 0.003 mm. The first closure portion 127a in a dosage-delivery device that is set up for operation is arranged below the delivery portion 128, and the second closure portion 127b is arranged above the delivery portion 128. The first closure portion 127a thus forms the outer end of the delivery- and closure element 106. This way, the surface 121 which forms the bottom edge of the delivery- and closure element 106 can close off the outlet orifice 7 of the dosage-delivery head 101 in flush alignment as illustrated in FIG. 2b.

When a dosage delivery is in progress, the outlet orifice 7 is initially closed, with the delivery- and closure element 106 positioned so that the first closure portion 127a is located in the outlet orifice 7. As the delivery- and closure element 106 in this first closed position rotates about the central lengthwise axis 4, an indentation in the form of a recess 120 which is arranged in the delivery portion 128 and which is positioned inside the dosage-delivery head 101 is filled with the substance to be dispensed. This step is immediately followed by a translatory downward displacement of the delivery- and closure element 106, whereby the delivery portion 128 arrives in a position outside of the dosage-delivery head 101. The second closure portion 127b now enters into the outlet orifice 7 and closes it up. As a result of rotation and/or through the action of an agitator (see FIG. 6b), the substance to be dispensed is set free from the recess 120 and drops into a container that is located below the dosage-delivery device. The container is preferably resting on the weighing pan of a balance which is used to determine the delivered substance quantity but which is not shown here because it is not a subject of the present invention.

The delivery surface 110 is a surface that is curved in at least one direction and has a spiraling twist about the central lengthwise axis 4. However, the delivery surface could also be concave-curved in two directions in the area of the recess 120 and/or it could have a spiraling twist about the central lengthwise axis 4. When the recess 120 is filled with substance to be dispensed, a measured portion of the substance is carried outside of the dosage-dispensing head 101 as the delivery- and closure element 106 is moved along the central lengthwise axis 4. This allows a targeted control of the quantity of substance in powder- or paste form that is delivered by the dosage-dispensing head 101.

A concave curvature of the surface 110 and in particular a slightly spiraling shape of the recess 120 about the central lengthwise axis has the effect that with the rotation of the delivery- and closure element 106 the substance to be delivered is taken along in a controlled manner by the delivery surface 110, and the recess 120 is filled with a defined quantity of the substance. This arrangement is of particular advantage in the case of pulverous substances with poor flow properties, such as for example sticky powders, or for the dispensing of pasty substances. It is further of considerably advantage in this case if a conveying tool 12 is used.

Figure 3:
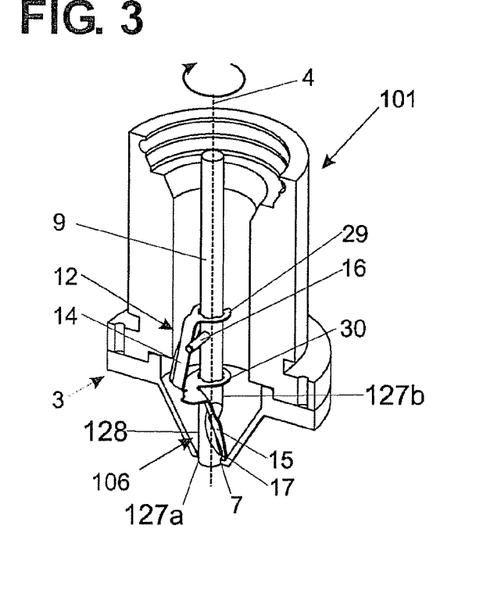
FIG. 3 illustrates the dosage-dispensing head of FIG. 2b with the addition of a conveying tool.

In the embodiment shown in FIG. 3, a conveying tool 12 is arranged inside the dosage-dispensing head 101. The conveying tool 12 has a holder device whereby the conveying tool embraces the rod 9 in two positions above each other, so that the conveying tool 12 is loosely connected to the rod 9. The conveying tool 12 further has a stirrer part 14 and a conveying element 15 configured in the shape of a shovel or a scraper. An upper ring-shaped holder 29 of the conveying tool 12 is arranged above a transverse bolt 16 that is solidly connected to the rod 9, while a lower ring-shaped holder 30 is arranged below the transverse bolt 16. With this arrangement, the conveying tool 12 is movably constrained in the dosage-dispensing device. With a translatory displacement of the rod 9 along the central lengthwise axis 4, i.e., to deliver substance that is to be dispensed, the loose attachment of the conveying tool 12 to the rod 9 ensures that, due to the force of gravity, the conveying tool 12 always remains in loose contact with the rim of the outlet orifice 7. Furthermore, as the rod 9 rotates, the transverse bolt 16 is brought into contact with the stirrer part 14 and pushes the conveying tool 12 to participate in the rotation.

The stirrer part 14 serves to loosen the substance to be dispensed during the time while the substance is in the area of the dosage-dispensing head 101.

The conveying element 15 preferably includes a portion with an extensive smooth surface with a tip 17 facing towards the rim of the outlet orifice 7, wherein the tip 17 is in loose contact with the rim of the outlet orifice 7. The conveying element 15, more specifically its extensive smooth surface portion, preferably has a rounded or curved shape, so that it can act like a shovel to take along strongly coagulating powder and direct it to the recess 120.

Due to the rotation of the conveying tool 12 about the central lengthwise axis 4, the conveying element 15 moves on a circular path. It has proven to be advantageous if the conveying element 15 is positioned at an acute angle relative to the tangential direction of the circular path traveled by the conveying element 15 in its rotation about the central lengthwise axis 4, and/or the conveying element 15 is slanted at an acute angle relative to the central lengthwise axis 4. The angular position of the conveying element is adapted in particular to the consistency of the substance to be dispensed. The shape and orientation of the conveying tool 12 determines the sense of rotation of the delivery- and closure element 6 and thus of the conveying tool 12 for the embodiment of the dosage-dispensing device shown in FIG. 3. The rotation in the illustrated case is clockwise.

As has already been mentioned above, the conveying tool 12 is constrained or guided on the rod 9 in such a way that on the one hand the conveying tool shares the rotation of the rod 9, but on the other hand it does not participate in a displacement of the rod 9 or the delivery- and closure element 106 along the central lengthwise axis 4, meaning that the conveying element 15 and specifically its tip 17 always remains in loose contact with the rim of the outlet orifice 7, so that it directs and pushes the powder inwards to fill the recess 120 and at the same time wipes the powder off the rim of the outlet orifice 7. This is illustrated in FIGS. 4a and 4b which show a sectional drawing of the dosage-dispensing head 101.

Figure 4A:
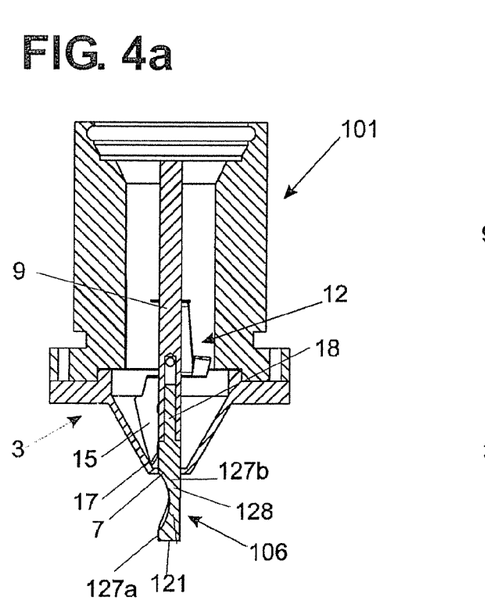
FIG. 4a shows a sectional view of the dosage-dispensing head of FIG. 3, but with the delivery- and closure element in the second closed position.
Figure 4B:
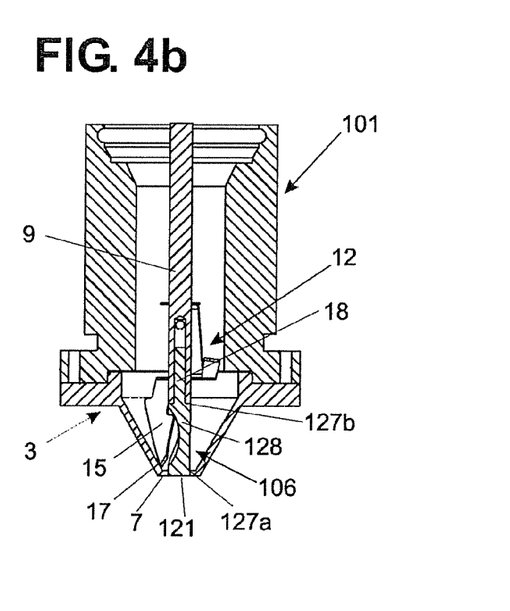
FIG. 4b shows a sectional view of the dosage-dispensing head of FIG. 3, wherein the delivery- and closure element is shown in the first closed position.

With the form of representation that was chosen for FIGS. 4a and 4b it is also possible to see how the delivery- and closure element 106 is connected to the rod 9. A bolt 18 of a smaller diameter than the diameter of the delivery- and closure element 106 is inserted in the rod 9 and is for example screwed, glued, or otherwise fixedly connected to the latter.

Figure 5:
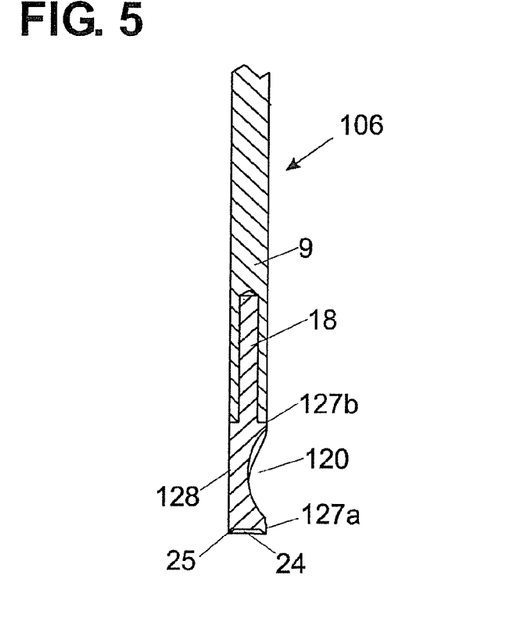
FIG. 5 shows a lengthwise section of the delivery- and closure element of the preceding drawing figures.

The delivery- and closure element 106 of the preceding drawing figures can be seen in FIG. 5 in a sectional view. The delivery- and closure element 106 is connected to the rod 9 by means of a bolt 18, in particular a screw bolt. As shown here to give an example, a delivery- and closure element 106 whose first closure portion 127a is in flush alignment with the housing 3 when the outlet orifice 7 is closed in the first closed position (as shown for example in FIG. 4b) can have a recess 24 at its end face 121. This recess 24 is surrounded by a rim 25 which acts as a drop-releasing edge, so that when strongly coagulating substances are being dispensed, it is made impossible for material to accumulate at the end surface 121.

Figure 6A:
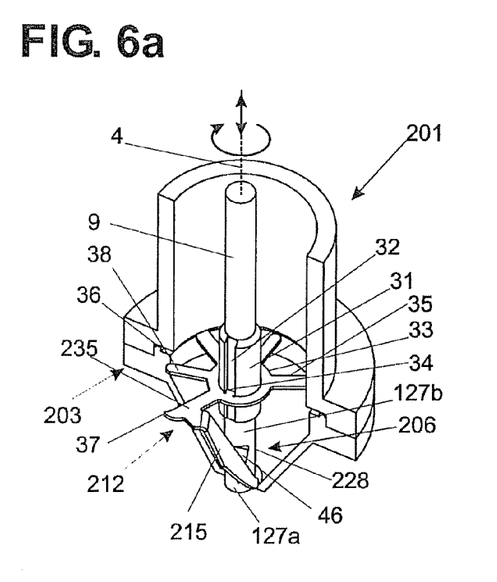
FIG. 6a illustrates in a three-dimensional drawing a dosage-dispensing head with a second embodiment of the delivery- and closure element in the first closed position and with a second embodiment of the conveying tool, with the housing cut open in the lengthwise direction.
Figure 6B:
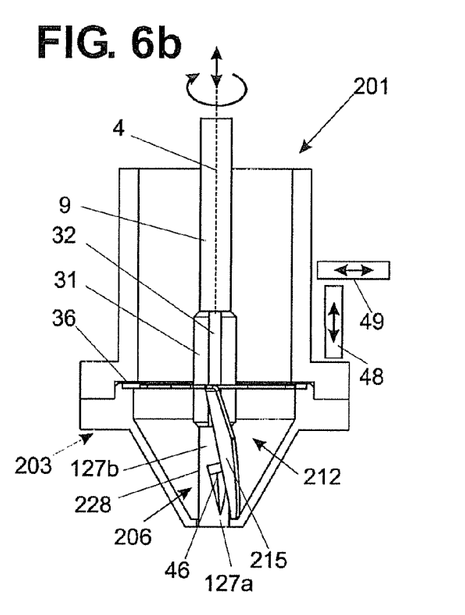
FIG. 6b shows a side view of the dosage-dispensing head of FIG. 6a, with its housing cut open in the lengthwise direction.

A second embodiment of the delivery- and closure element 206 can be seen in FIG. 6a in a three-dimensional view of the dosage-dispensing head 201 and in FIG. 6b in a side view, wherein the housing 203 is cut open lengthwise. In this embodiment, the delivery portion 228 of the delivery- and closure element 206 is configured as a triangular groove 46 which is indented in the cylinder wall and which narrows into a point at its lower end, meaning that its width and depth are variable, i.e. decreasing towards the first closure portion 127. The delivery surface in this case is a discontinuous surface. It is also possible to have a plurality of grooves arranged on the delivery portion, with preference evenly distributed around the circumference of the latter. The grooves can be formed in the delivery portion with their tips directed vertically downward or slanted, as shown in FIGS. 6a and 6b.

The second conveying tool 212 which is illustrated in FIGS. 6a 6b has a conveying element 215 which is of a similar configuration as the conveying tool shown in FIGS. 3, 4a and 4b. In particular, the position of the conveying element 215 relative to the central lengthwise axis 4 is aligned at an acute angle relative to the tangential direction of its circular path in the rotation about the central lengthwise axis 4, as well as slanted at an acute angle relative to the central lengthwise axis 4. Furthermore, the conveying element 215 is arranged at an angle relative to the radius of its circular path and tangentially touches the rim of the outlet orifice 7. To hold and guide the conveying tool 212, the rod 9 has a take-along portion 31 with at least one groove 32 extending over the entire length of the rod 9. A holder ring 33 of the conveying tool 212 is arranged to loosely surround the take-along portion 31, engaging the groove 32 with a projection 34. Preferably, there are two grooves 32 and projections 34 arranged at diametrically opposite locations, where the second groove and projection could not be seen in the drawing, because they would be hidden by the rod 9. With this arrangement, the conveying tool 212 is constrained to share the rotation of the rod 9 but has free translatory mobility along the central lengthwise axis 4. The holder ring 33 has several spokes 35 projecting radially outwards from the central lengthwise axis 4 and engaging with their tips 37 a circular groove 36 in the housing 203 where they are movably guided. Further spokes without tips 37 serve as stirrer elements 38. The holder ring 33, the projections 34, the spokes 35, and the stirrer elements 38 lie in a plane that extends orthogonal to the central lengthwise axis 4. However, the stirrer elements 38 can also be bent upwards or downwards, which makes them more effective in the loosening of the substance to be dispensed. The conveying element is connected to, but preferably of one piece with, one of the spokes 235. The conveying tool 212 is made preferably of one piece of a sheet metal or plastic material.

An agitator which helps to free the groove 46 of the substance to be dispensed is indicated schematically in FIG. 6b. An agitator of this kind can be configured as a knocking- or vibrating tool 49 acting on the housing 203 in the direction orthogonal to the central lengthwise axis 4, or as a knocking- or vibrating tool 48 acting on the housing 203 in the direction parallel to the central lengthwise axis 4. As is self-evident, a knocking- or vibrating tool of this kind can also be designed to act on the delivery- and closure element 206 or on the rod 9. Alternatively, an agitator can also be configured in the form of brushes or lamellar wipers that are arranged on the outside of the housing around the outlet orifice 7, reaching into the recesses to release the substance to be dispensed. It is also conceivable to use an agitator which has a jet nozzle for compressed air which is arranged with its orifice directed at the delivery- and closure element.

Figure 7A:
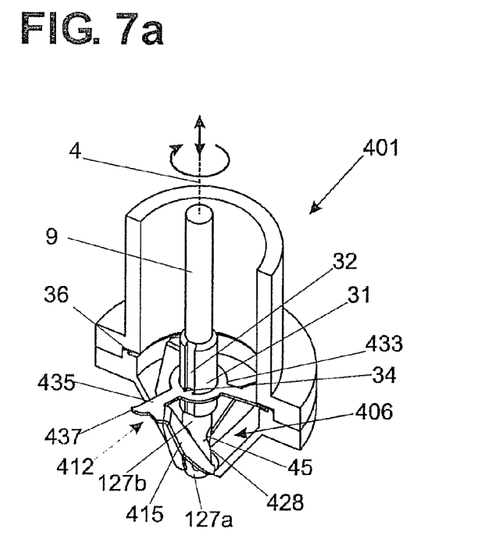
FIG. 7a illustrates in a three-dimensional drawing a dosage-dispensing head with a third embodiment of the deliveryand closure element in the closed position and with a third embodiment of the conveying tool, with the housing cut open in the lengthwise direction.
Figure 7B:
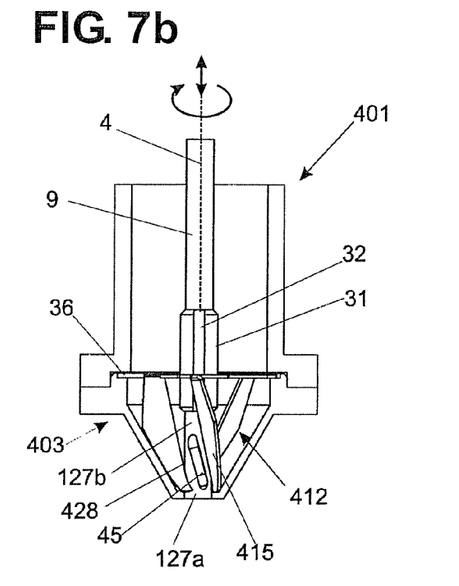
FIG. 7b shows a side view of the dosage-dispensing head of FIG. 7a, with its housing cut open in the lengthwise direction.

FIGS. 7a and 7b show a dosage-dispensing head 401 in a form of representation analogous to FIGS. 6a and 6b. This dosage dispensing head 401 includes a third embodiment of the delivery- and closure element 406 and a third embodiment of the conveying tool 412. The delivery portion 428 of the delivery- and closure element 406 has several elongated grooves 45 of variable depth and width in the circumference of the substantially cylinder-shaped delivery- and closure element 406. These grooves 45 are aligned with their longest dimension slanted at an acute angle relative to the central longitudinal axis 4 and represent recesses for the substance to receive and to deliver the substance in portions from the dosage-delivery head 401.

The conveying tool 412 has three conveying elements 415 which are monolithically connected to a holder ring 433. The holder ring 433 is constrained to the rod 9 by way of projections 34 engaging grooves 32 of a take-along portion 31, in the same way as has already been described above in the context of FIGS. 6a to 6d. In contrast to the embodiment illustrated there, the conveying tool 412 shown here has no stirrer elements 38, although they could be added. However, the functions of stirring and loosening of the substance to be dispensed can also be performed by the three spokes 435 as well as the three conveying elements 415. The latter are configured and oriented in the dosage-dispensing head 415 substantially like the conveying element 215 described above in the context of FIGS. 6a and 6b. The three spokes 435, each of which is connected to a conveying element 415, have tips 37 which are movably guided in the circular groove 36 of the housing 3.

Figure 8A:
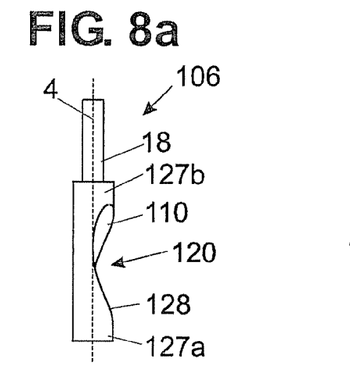
FIG. 8a shows the delivery- and closure element of FIGS. 1 to 5 in side view.
Figure 8B:
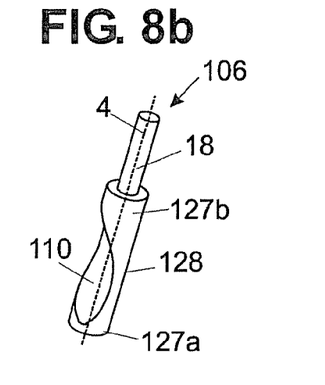
FIG. 8b shows the delivery- and closure element of FIG. 8a in a three-dimensional view.
Figure 8C:
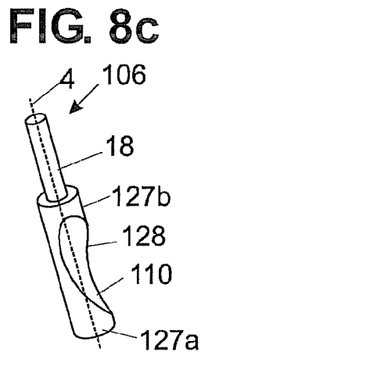
FIG. 8c shows the delivery- and closure element of FIG. 8c, but turned into a different position.

FIG. 8 shows different views of the first embodiment of the delivery- and closure element 106 which has already been presented in FIGS. 1 to 5. FIG. 8a shows the delivery- and closure element 106 from the side with a view at the delivery surface 110, FIGS. 8b and 8c shows the same in three-dimensional views. The recess 120 in the delivery portion 128 is delimited by a concave delivery surface 110 which has borders that are not aligned parallel to the plane that runs orthogonal to the central lengthwise axis 4, but enclose an arbitrary angle with that plane. A recess of this shape can be produced by means of a cylindrical cut directed at an angle other than 90° to the central lengthwise axis 4.

Figure 9A:
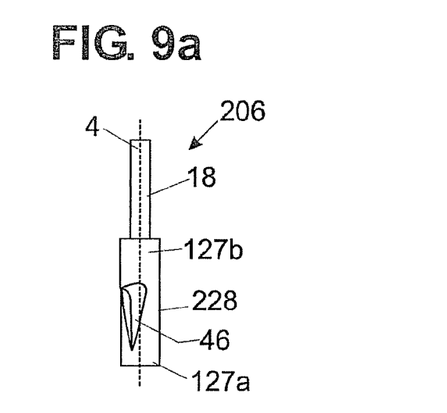
FIG. 9a shows the second embodiment of the delivery- and closure element as shown in FIGS. 6a and 6b, seen from the side with the view directed at the delivery surface.
Figure 9B:
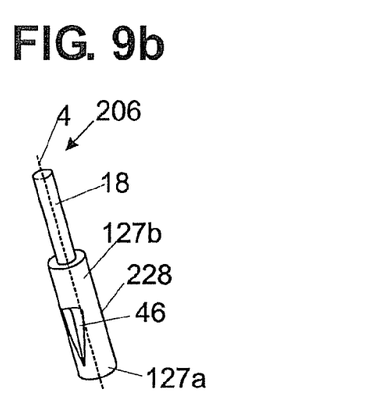
FIG. 9b shows the second embodiment of the delivery- and closure element in three-dimensional view.

FIG. 9 shows different views of the second embodiment of the delivery- and closure element 206 as presented in FIGS. 6a and 8b, with FIG. 9a showing a side view directed at the delivery surface and FIG. 9b showing a three-dimensional view. With the rotation of the delivery- and closure element the groove 46, which could also be oriented at an oblique angle relative to the direction of the central lengthwise axis 4, picks up and gets filled with the substance to be dispensed. The triangular configuration of the groove 46 which narrows into a tip at the bottom is particularly advantageous for the release of the substance.

Figure 10A:
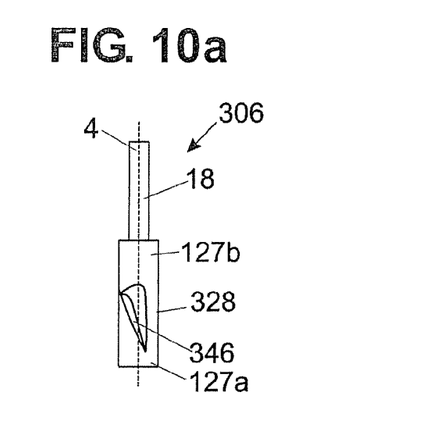
FIG. 10a shows a fifth embodiment of the delivery- and closure element in side view.
Figure 10B:
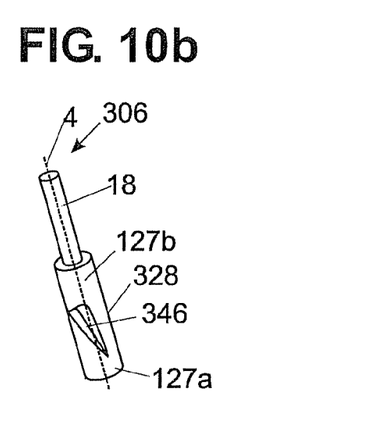
FIG. 10b shows the fifth embodiment of the delivery- and closure element in three-dimensional view.

FIGS. 10a and 10b illustrate a fifth embodiment of the delivery- and closure element 306 in an analogous form of representation as used in FIGS. 9a and 9b. The recesses in the delivery portion 328 are formed as two triangular grooves 346 (only one of which can be seen in FIGS. 9a and 9b) in the overall cylindrical form of the delivery- and closure element 306. Unlike the version of the delivery- and closure element 206 shown in FIGS. 9a and 9b, the bottom lines 11 of the triangular grooves 346 are not parallel to the central lengthwise axis, but are oriented at an oblique angle to the central lengthwise axis.

Figure 11A:
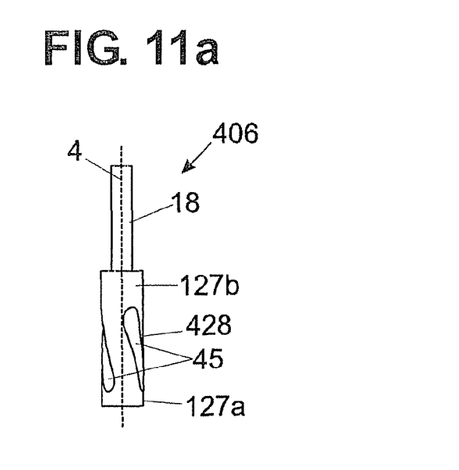
FIG. 11a shows the third embodiment of the delivery- and closure element as shown in FIGS. 7a and 7b, seen from the side with the view directed at the delivery surface.
Figure 11B:
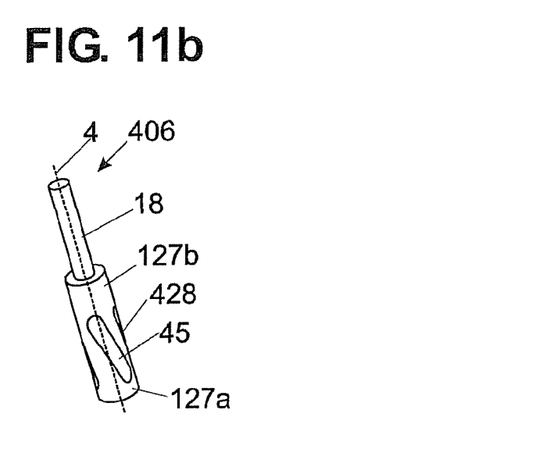
FIG. 11b shows the third embodiment of the delivery- and closure element in three-dimensional view.

FIG. 11 shows the third embodiment of the delivery- and closure element 406 as shown in FIGS. 7a and 7b, with FIG. 11a showing a side view directed at the delivery surface and FIG. 11b showing a three-dimensional view. In this embodiment, several elongated grooves 45 of variable depth and width are arranged in the circumference wall of the substantially cylindrical delivery- and closure element 406, which are milled for example by means of ball cutters.

Figure 12A:
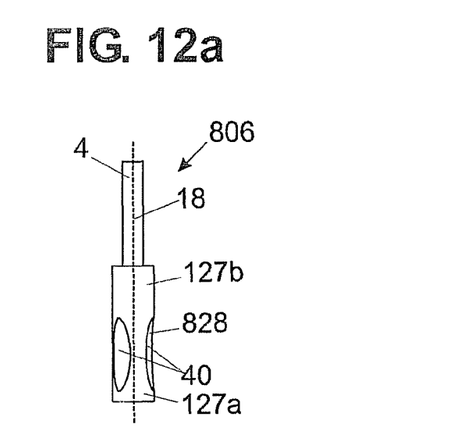
FIG. 12a shows a fourth embodiment of the delivery- and closure element, seen from the side with the view directed at the delivery surfaces.
Figure 12B:
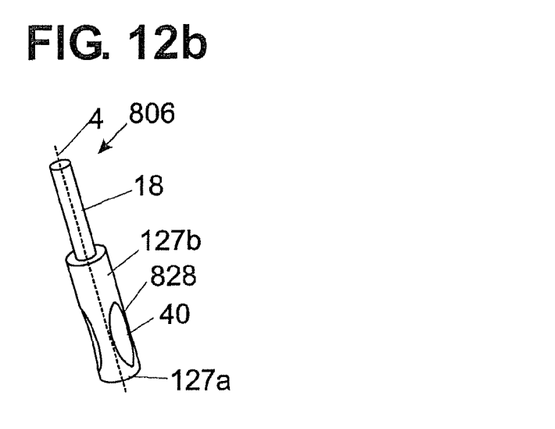
FIG. 12b shows the fourth embodiment of the delivery- and closure element in three-dimensional view.

FIG. 12 shows different views of a fourth embodiment of the delivery- and closure element 806, with FIG. 12a showing a side view directed at the delivery surface and FIG. 12b showing a three-dimensional view. Three elongated recesses 40 with mirror-symmetric borders in the form of circular segments are arranged around the delivery portion 828 with their planes of symmetry running parallel to the central lengthwise axis 4.

Figure 13A:
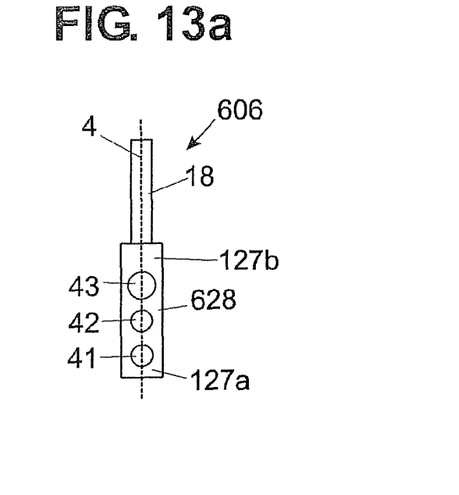
FIG. 13a shows a sixth embodiment of the delivery- and closure element, seen from the side with the view directed at the delivery surfaces.
Figure 13B:
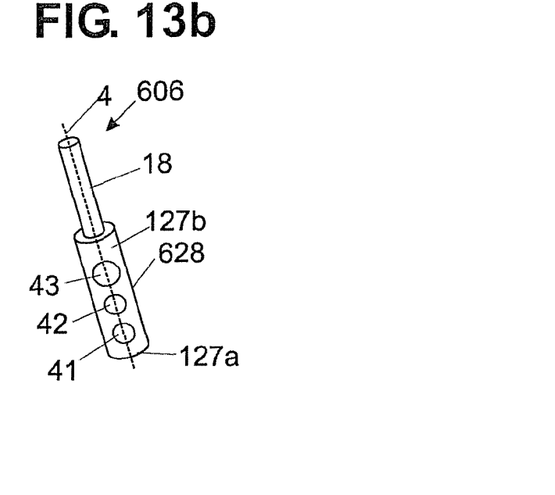
FIG. 13b shows the sixth embodiment of the delivery- and closure element in three-dimensional view.

A sixth embodiment of the delivery- and closure element 606 can be seen in FIG. 13. The delivery portion 628 is distinguished by three recesses in the shape of circular indentations 41, 42, 43 that are arranged above each other. These indentations which, besides, could differ among each other in their diameters and/or depths, can be filled with the substance to be dispensed when the delivery- and closure element 606 is in the first closed position. The substance can now be released simultaneously from all three of the indentations by positioning the delivery- and closure element 606 so that its second closure portion 127b is located in the outlet orifice 7. However, the substance can also be released sequentially from one indentation 41 or from two indentations 41, 42, if the delivery- and closure element 606 is positioned so that its section between the indentation 41 and 42 as a third closure portion 127c is located in the outlet orifice 7, or the section between the indentation 42 and 43 as a fourth closure portion 127d is located in the outlet orifice 7. Of course, it is also conceivable to arrange further sets of indentations 41, 42, 43 around the delivery- and closure element 606.

Variants of the housing of the dosage-dispensing head as well as different embodiments of the drive mechanism are conceivable. In principle, the conveying tool can also have its own drive mechanism and its translatory as well as rotational mobility can be independent of the delivery- and closure element. The rod with the delivery and closure element in a further embodiment can be tension-biased in the translatory direction so that when the drive mechanism is uncoupled, the outlet orifice is automatically closed.

The outlet orifice can also be configured as a tubular passage, so that intermediate positions are possible where the at least one recess is covered in its entirety by the outlet orifice.

LIST OF REFERENCE SYMBOLS

101, 201, 401 dosage-dispensing head
2 supply container
3, 203, 403 housing
4 central lengthwise axis
5 internal screw thread
106, 206, 306, 406, 606, 806 delivery- and closure element
7 outlet orifice
8 external screw thread
9 rod
110 delivery surface
11 bottom line of groove
12, 212, 412 conveying tool
14 stirrer part
15, 215, 415 conveying element
16 transverse bolt
17 tip of the conveying element
18 bolt
19 coupling area
120 recess
121 end surface
23 projecting ledge
24 recess
25 rim of the recess
127a, 127b, 127c, 127d closure area
128, 228, 328, 428, 628, 828 delivery area
29 upper ring-shaped holder
30 lower ring-shaped holder
31 take-along portion
32 groove
33 holder ring
34 projection
35, 235, 435 spoke
36 circular groove
37 tip
38 stirrer element
40 elongated indentation
41 circular indentation
42 circular indentation
43 circular indentation
45 elongated groove
46, 346 triangular groove
48 knocking- or vibrating tool
49 knocking- or vibrating tool

The invention claimed is:

1. Dosage-dispensing device for substances in powder- or paste form with a supply container and with a dosage-dispensing head that is connected or connectable to the supply container, said dosage-dispensing head comprising a housing with an outlet orifice of circular cross-section and a delivery- and closure element, wherein the outlet orifice and the delivery- and closure element are arranged on the central lengthwise axis of the dosage-dispensing head, and the delivery- and closure element is designed to be rotatable about the central lengthwise axis in relation to the housing and to be capable of translatory displacement relative to the outlet orifice along the central lengthwise axis, wherein the delivery- and closure element in its basic configuration is of a cylindrical shape and has at least two closure portions that are arranged at a distance from each other along the central lengthwise axis and serve to close off the outlet orifice and further has, between the closure portions, a delivery portion that serves to deliver the substance to be dispensed, wherein said delivery portion comprises at least two recesses arranged one above the other that are indented from the cylinder wall, and further comprises a conveying tool which serves to convey substance to be dispensed and which is configured to be rotatable about the central lengthwise axis and supported in a way that allows translatory movement relative to the delivery- and closure element along the central lengthwise axis.

2. Dosage-dispensing device according to claim 1, wherein in relation to the operating position of the dosage-dispensing device, a first closure portion is arranged above the delivery portion and a second closure portion is arranged below the delivery portion.

3. Dosage-dispensing device according to claim 1, wherein the delivery- and closure element is able to rotate when the first closure portion is located in the outlet orifice as well as when the second closure portion is located in the outlet orifice.

4. Dosage-dispensing device according to claim 1, wherein the at least one recess has a continuous surface which forms a delivery surface.

5. Dosage-dispensing device according to claim 4, wherein the delivery surface is shaped with a concave curvature in one or in two directions.

6. Dosage-dispensing device according to claim 1, wherein the at least two recesses are in the shape of circular indentations.

7. Dosage-dispensing device according to claim 2, wherein when the delivery- and closure element is in its closed position, the first closure portion is positioned so that its lower end relative to the operating position ends in flush alignment with the housing.

8. Dosage-dispensing device according to claim 7, wherein the first closure portion has at its end surface a recess that is surrounded by a rim which functions as a drop-releasing edge.

9. Dosage-dispensing device according to claim 1, wherein the width and/or the depth of the at least one recess of the delivery portion vary in such a way that the profile of said recess becomes smaller in the direction towards the first and/or the second closure portion.

10. Dosage-dispensing device according to claim 1, wherein the delivery- and closure element is connected to a rod which is arranged along the central lengthwise axis and traverses the supply container as a drive shaft.

11. Dosage-dispensing device according to claim 1, wherein the conveying tool is supported and/or guided on a rod in a way that allows translatory movement along the rod and relative to said rod.

12. Dosage-dispensing device for substances in powder- or paste form with a supply container and with a dosage-dispensing head that is connected or connectable to the supply container, said dosage-dispensing head comprising a housing with an outlet orifice of circular cross-section and a delivery- and closure element, wherein the outlet orifice and the delivery- and closure element are arranged on the central lengthwise axis of the dosage-dispensing head, and the delivery- and closure element is designed to be rotatable about the central lengthwise axis in relation to the housing and to be capable of translatory displacement relative to the outlet orifice along the central lengthwise axis, wherein the delivery- and closure element in its basic configuration is of a cylindrical shape and has at least two closure portions that are arranged at a distance from each other along the central lengthwise axis and serve to close off the outlet orifice and further has, between the closure portions, a delivery portion that serves to deliver the substance to be dispensed, wherein said delivery portion comprises at least two recesses arranged one above the other that are indented from the cylinder wall, and further comprises a conveying tool which serves to convey substance to be dispensed and which is configured to be rotatable about the central lengthwise axis and supported in a way that allows translatory movement relative to the delivery- and closure element along the central lengthwise axis, wherein the conveying tool comprises a stirrer part and a conveying element, wherein the conveying element is always in loose contact with the rim of the delivery orifice when the dosage-dispensing device is in operation.

13. Dosage-dispensing device according to claim 1, wherein the housing has a narrowing taper in the direction towards the outlet orifice.

14. Dosage-dispensing device according to claim 1, wherein the delivery- and closure element is made of metal or a ceramic material, wherein the surface of the at least one recess has a surface roughness $R_a$ of less than 0.003 mm.

15. Dosage-dispensing device according to claim 1, wherein the dosage-dispensing device comprises at least one agitator which serves to remove the substance to be dispensed from the at least one recess.

16. Dosage-dispensing device according to claim 15, wherein the at least one agitator comprises brushes or lamellar wipers that can reach into the at least one recess.

17. Dosage-dispensing device according to claim 15, wherein the at least one agitator comprises a knocking- and/or vibrating tool which is designed to act on the housing and/or on the delivery- and closure element and/or on the rod with its action directed parallel and/or orthogonal to the central lengthwise axis.

18. Method for dispensing substances in the form of a powder or paste in measured doses from a supply container to which a dosage-dispensing head is or can be connected in accordance with claim 1, wherein:

in a first closed condition of the outlet orifice, where the first closure portion is located in the outlet orifice and the delivery portion is located inside the dosage-dispensing head, the at least one recess is filled with substance through a rotation of the delivery- and closure element;

the at least one recess of the delivery portion which is filled with the substance to be dispensed is moved into an area outside of the dosage-dispensing head through a translatory displacement of the delivery- and closure element along the central lengthwise axis; and in a second closed condition of the outlet orifice, where the second closure portion is located in the outlet orifice, the substance is released from the at least one recess through a rotation of the delivery- and closure element.

19. Method according to claim 18, wherein substance to be dispensed is brought into the at least one recess by means of the conveying tool.

20. Method according to claim 19, comprising the presence of an agitator by means of which the substance is released and set free from the at least recess of the delivery portion.

* * * * *